No. 807,078. PATENTED DEC. 12, 1905.
G. J. HOELZER.
TRIPOD HEAD.
APPLICATION FILED MAR. 7, 1905.

WITNESSES:
INVENTOR
George J. Hoelzer,
By Milo B. Stevens & Co.
Attorneys.

UNITED STATES PATENT OFFICE.

GEORGE J. HOELZER, OF CHICAGO, ILLINOIS.

TRIPOD-HEAD.

No. 807,078.  Specification of Letters Patent.  Patented Dec. 12, 1905.

Application filed March 7, 1905. Serial No. 248,886.

*To all whom it may concern:*

Be it known that I, GEORGE J. HOELZER, a citizen of the United States, residing at Chicago, in the county of Cook and State of Illinois, have invented new and useful Improvements in Tripod-Heads, of which the following is a specification.

This invention is an improved tripod-head of that kind permitting adjustment of the camera to different horizontal and vertical angles, and it is characterized by improvements, as will more specifically appear in the following specification and claims.

Figure 2:
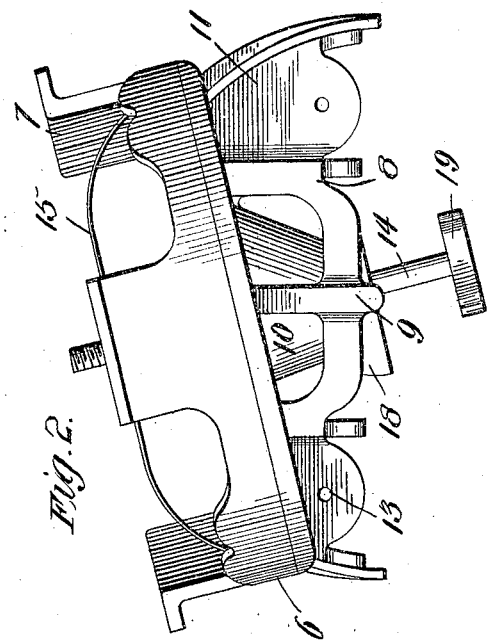
Figure 4:
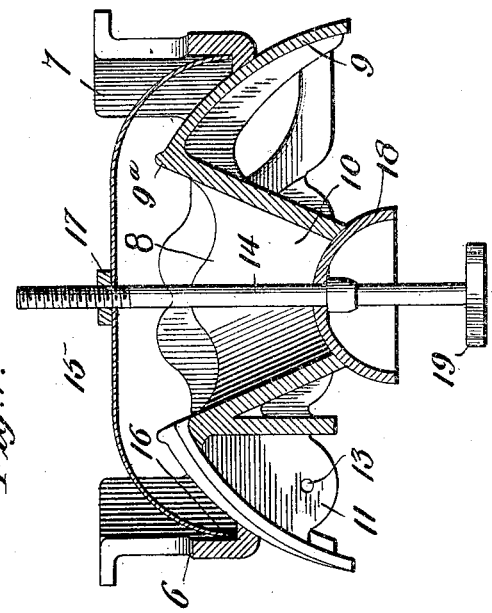
Figure 1:
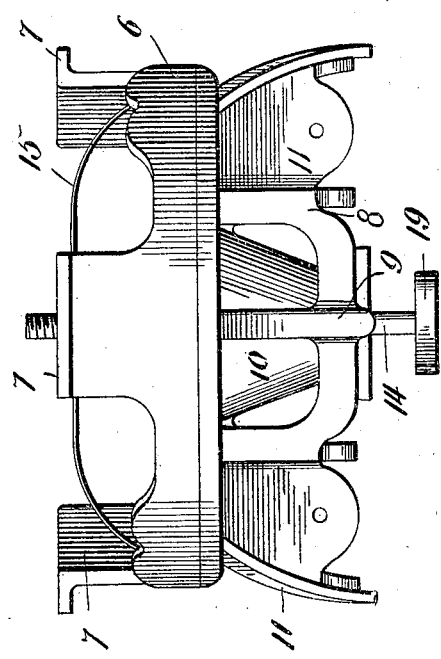
Figure 3:
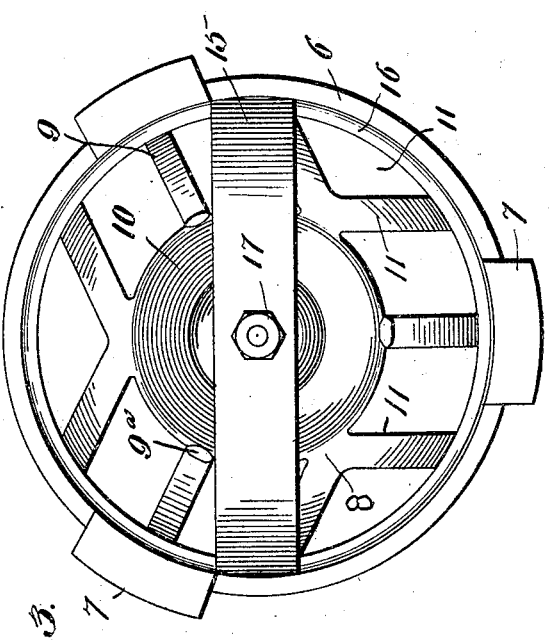

In the accompanying drawings, Figure 1 is a side elevation of the head. Fig. 2 is a similar view at a different inclination. Fig. 3 is a top plan view of the head. Fig. 4 is a cross-section on the line 4 4 of Fig. 3.

The head includes two main members or pieces forming a ball-and-socket joint permitting universal movement, said pieces being held together by spring and bolt, which bolt also acts to bind the camera to the head.

Referring specifically to the drawings, the socket-piece consists of a ring 6, within which the other member fits. This ring has three upwardly-extending arms 7, upon which the camera sets, as indicated in Figs. 1 and 2. The ball member 8 of the joint comprises a skeleton casting having a series of radial downwardly-curved ribs 9 projecting from the upper end or rim of a central tubular piece 10, the lower end of which is of less diameter than the upper end. The ring 6 rests upon the ribs 9 and is held at adjusted position by frictional contact therewith. At the top the ribs have stops $9^a$, which by contact therewith of the inner edge of the ring 6 act to limit the tilt or vertical angular inclination of the head. The member 8 is shaped to form three sets of parallel cheeks 11, between which the upper ends of the tripod-legs are pivoted, as at 13.

The members 6 and 8 are yieldingly held together by a center bolt 14 and a flat spring 15. The spring is arched across within the ring 6 and rests at its ends upon a shoulder 16, formed in the inner side of the ring. The upper end of the bolt extends through a hole in the spring, and the downward tension or pressure of the spring is regulated by a nut 17 on the bolt, which nut also holds the spring in place. The tension of the spring, and consequently the tension of the frictional bearing between the ring 6 and the ribs 9, is varied by adjusting the nut. The bolt swings laterally in any direction within the flared central tube 10, and to permit this action the bolt carries a half-ball 18, the rounded face of which bears upwardly against the lower end of said tubular portion. Below the ball the bolt has a wing-head 19, so that it may be turned by hand to screw the bolt in the tap in the bottom of the camera-box.

The construction shown permits the ring 6 to be turned to vary the horizontal inclination and also to be tilted to vary the vertical inclination of the camera. The spring and the means of adjusting its tension allows the action to be made as easy or as stiff as desired or as conditions demand.

What I claim as new, and desire to secure by Letters Patent, is—

1. In a tripod-head, the combination with a ring upon which the camera rests, of a curved member on which the ring fits, and having a central opening and socket, and a binding-bolt extending through said opening and the ring and adapted to be screwed into the camera and having a ball thereon fitting the socket.

2. In a tripod-head, the combination with the socket-ring 6 upon which the camera rests, of the ball member 8 upon which the ring fits, having the central tube 10, the spring extending across and resting on the ring, and the bolt connected to the spring and extending through said tube and having a ball fitting against the lower end thereof.

In testimony whereof I have signed my name to this specification in the presence of two subscribing witnesses.

GEORGE J. HOELZER.

Witnesses:
H. G. BATCHELOR,
WILLIAM J. HACKER.